US00RE34273E

United States Patent [19]

Phillips et al.

[11] E Patent Number: Re. 34,273

[45] Reissued Date of Patent: Jun. 8, 1993

[54] DOUBLE WINDOW SHADE ASSEMBLY WITH INDEPENDENT SHADE MOVEMENT

[75] Inventors: William R. Phillips; Blaine A. Bush, both of Lakewood; John J. O'Brien, Littleton; Charles R. Thalken, Denver, all of Colo.

[73] Assignee: Ultimate Window Coverings, Inc., Lakewood, Colo.

[21] Appl. No.: 751,346

[22] Filed: Aug. 28, 1991

Related U.S. Patent Documents

Reissue of:

[64] Patent No.: 4,953,610
Issued: Sep. 4, 1990
Appl. No.: 325,375
Filed: Mar. 17, 1989

[51] Int. Cl.[5] ..... E06B 3/94
[52] U.S. Cl. ..... 160/84.1; 160/115
[58] Field of Search ..... 160/84.1, 279, 115, 160/214, 178.1

[56] References Cited

U.S. PATENT DOCUMENTS

| | | | |
|---|---|---|---|
| 1,038,005 | 9/1912 | Shaft | 160/84.1 |
| 2,247,260 | 6/1941 | Stone | 160/84.1 |
| 2,254,820 | 9/1941 | Donner . | |
| 2,350,094 | 5/1944 | Butts . | |
| 3,465,806 | 9/1969 | Sulkes . | |
| 3,789,904 | 2/1974 | Takazawa . | |
| 4,202,395 | 5/1980 | Heck et al. . | |
| 4,344,473 | 8/1982 | Shore . | |
| 4,418,739 | 12/1983 | Woolnough et al. . | |
| 4,625,786 | 12/1986 | Carter et al. . | |
| 4,647,488 | 3/1987 | Schnebly et al. | 160/84.1 X |
| 4,687,039 | 8/1987 | Chumbley . | |
| 4,733,710 | 3/1988 | Haines . | |
| 4,733,711 | 3/1988 | Schon . | |
| 4,799,524 | 1/1989 | Guermonprez | 160/84.1 |
| 4,813,468 | 3/1989 | Fraser | 160/84.1 |

FOREIGN PATENT DOCUMENTS

| | | |
|---|---|---|
| 0058459 | 8/1982 | European Pat. Off. . |
| 1562764 | 3/1980 | United Kingdom . |
| 8807345 | 10/1988 | World Int. Prop. O. . |

*Primary Examiner*—David M. Purol
*Attorney, Agent, or Firm*—Sheridan Ross & McIntosh

[57] ABSTRACT

A window shade assembly is provided that includes a pair of independently movable shades, which are located in a front-to-back relationship. The front shade is made of a substantially translucent or light passing material while the back shade is made of a substantially opaque or light blocking material. The user of the window shade assembly is able to adjust one or both of the front and back shades to control where outside light is able to pass through the assembly including the amount of outside light that passes through the front shade or passes directly into the room without passing through the front shade.

14 Claims, 8 Drawing Sheets

DOUBLE WINDOW SHADE ASSEMBLY WITH INDEPENDENT SHADE MOVEMENT

Matter enclosed in heavy brackets [ ] appears in the original patent but forms no part of this reissue specification; matter printed in italics indicates the additions made by reissue.

FIELD OF THE INVENTION

The present invention relates to window shades and, in particular, a double window shade construction with the two shades being in a front-to-back relationship along their unfolded length and in which at least one of the shades is independently movable relative to the other.

BACKGROUND OF THE INVENTION

Numerous window shade configurations have been devised or proposed. In designing a window shade, a number of factors are considered. The primary objectives commonly sought in window shade designs include obtaining a desirable degree of privacy while achieving an aesthetically pleasing appearance so as to enhance, and not diminish, the decor of the room with which the window shade i used. It is also important that the window shade or shades be readily operable or manipulatable so that the degree of privacy afforded by the window shade(s) can be varied and, concomitantly, so that the window shade(s) can be selectively adjustable to a number of desirable, different positions.

In one known window shade construction, a pair of window shades are positioned in a window frame in a stacked relationship, i.e., with one window shade being located vertically on top of the other shade. In U.S. Pat. No. 4,733,710 issued Mar. 29, 1988, to Haines and entitled "Vehicular Shade," such a construction is disclosed wherein one of the two vertically stacked shades is made of an opaque material while the other of the two shades is made of a translucent or screen-like material. The user can selectively cover the window with the opaque pleated shade, the translucent pleated shade or a combination of both. For example, if the bottom of the two vertically disposed shades is opaque and lowered first, then the window is covered by the opaque material. Conversely, lowering the translucent pleated shade progressively collapses the opaque shade and at the same time extends coverage of the upper translucent pleated shade over the window. U.S. Pat. No. 4,733,711 issued Mar. 29, 1988, to Schon and entitled "Folding Blind, Composite Folding Blind and Coupling Strip Therefore" also discloses a pair of vertically stacked window shades. In the double stacked embodiment of FIG. 8, each of the two shade constructions includes an intermediate beam, which is movable relative to a fixed beam of the same window shade assembly and is also movable relative to the intermediate beam and the fixed beam of the other window shade assembly. This patent also discloses a window shade construction in FIG. 3, for example, whereby the pleated shades can be selectively moved from one or both of the top and bottom of the fixed beams of the window shade assembly. U.S. Pat. No. 3,465,806 issued Sep. 9, 1969, to Sulkes and entitled "Pleated Blind Assembly" also discloses a similarly movable single pleated shade, as does U.S. Pat. No. 4,202,395 issued May 13, 1980, to Heck et al. and entitled "Adjustable Shade Construction."

In some window shade designs, a more important factor relates to providing a window shade with significantly enhanced insulative properties. U.S. Pat. No. 4,687,039 issued Aug. 18, 1987, to Chumbley and entitled "Insulative Pleated Window Shade" describes a pair of window shades that are disposed in a front-to-back relationship along the depth or thickness of the window frame. Each of the two shades has one vacuum deposited, aluminized reflective layer, which layers face each other. Such layers are important in achieving the desired insulation. Further, the two pleated shades are not independently movable but, rather, move together when the position of the window shade is adjusted relative to the window frame. Another double window shade assembly is disclosed in U.S. Pat. No. 2,350,094 issued May 30, 1944, to Butts et al.; however, this window shade assembly is intended to block the passage of light while, if desired, providing ventilation within the room having the window shade assembly. Specifically, each of the two pleated shades includes alternating perforated and imperforated panels. The perforations permit the passage of air, when the window is open, but not the passage of light. A similar window shade construction is described in U.S. Pat. No. 2,254,820 issued Sept. 2, 1941, to Donner and entitled "Blind." Another double layer pleated shade is described in U.S. Pat. No. 4,625,786 issued Dec. 2, 1986, to Carter et al. and entitled "Insulated Window Shade Assembly." This assembly includes two layers of window shades wherein each layer is moved together. This window shade configuration is also intended to provide improved insulation at the window area. None of the foregoing three shade assemblies permits independent movement of one shade relative to the other.

A different type of double layer curtain or shade is disclosed in U.S. Pat. No. 4,418,739 issued Dec. 6, 1983, to Woolnough et al. and entitled "Insulating Window Covering." This patent discloses a non-pleated shade used with rollers to provide a double layer using a single shade. U.S. Pat. No. 3,789,904 issued Feb. 5, 1974, to Takazawa entitled "Double Curtain Device" and U.S. Pat. No. 4,344,473 issued Aug. 17, 1982, to Shore and entitled "Means for Separating Light Reflective Fabrics" also relate to double layer shades, which are developed using rollers and a single piece of material.

Although a considerable number of different types of window shades have been disclosed including double layered shades, it remains desirable to provide a window shade that incorporates in one unit the desired features of privacy, pleasing appearance and adjustability of light transmission while being easily operated and which avoids unsightly stacking of pleated window shades. In that regard, none of the known prior art discloses the construction and advantages associated with the independently movable, double pleated shades arranged in a front-to-back relationship disclosed herein for achieving the aforesaid features.

SUMMARY OF THE INVENTION

A pleated window shade assembly is provided that includes a first or front pleated shade and a second or back pleated shade. The window shade assembly is adapted to be mounted to a suitable window frame wherein the front pleated shade is disposed closer to the interior of the room in which the window shade assembly is provided while the second pleated shade is disposed relatively more adjacent to the exterior of the room in which the window shade assembly is provided.

The second pleated shade is independently movable relative to the first pleated shade so that the user can independently adjust or unfold it to a desired length within the window frame. To achieve a desired degree of privacy, the front shade is made of a substantially translucent or sheer material whereby light is able to pass through the front shade so that one can see into and out of the room through the front shade when it alone covers the window. To achieve the desired degree of privacy, the back shade is made of a substantially opaque or light blocking material so that the user is able to unfold the opaque back shade to a desired length whereby light is prevented from passing through the window shade assembly along the length of the unfolded opaque back shade.

The window shade assembly includes draw cords connected to each of the front and back shades for adjusting the positions of the shades relative to the window frame. In one embodiment, the draw cords inserted through apertures in the pleated front shade have reduced visibility to the viewer when the front shade is unfolded because the apertures are provided offset from the centers of the pleated front shade panels. Header beams are also attached to end portions of the pleated shades for use in independently adjusting or moving the shades. The window shade assembly also includes conventional cord lock units or mechanisms, with each cord lock unit being operably connected to a set of draw cords.

In one embodiment, a first movable header beam is connected to first end portions of the back shade, which first header beam is adjacent to the bottom of the window frame when the back shade is substantially, completely unfolded. In this embodiment, the back shade can be moved relative to the front shade from the top of the window frame towards the bottom thereof to increase the degree of opaqueness associated with the window shade assembly. Similarly, in another embodiment, a second movable header beam is connected to second end portions of the back shade, which second header beam is located adjacent to the top of the window frame when the back shade is substantially, completely unfolded. In this embodiment, unlike the other embodiment, the degree of opaqueness is increased by moving or adjusting the back shade in a direction from the bottom of the window frame to its top. Another related embodiment involves the use of both the first and second header beams connected to the top and bottom end portions of the back shade, respectively. In this embodiment, the opaque back shade can be selectively moved away from, or towards, both the bottom and the top of the window frame.

In another embodiment associated with the translucent front shade, it includes a pair of movable header beams, each of which is connected to end portions of the front shade. One of the two header beams is located adjacent to the bottom of the window frame when the front shade is substantially, completely unfolded while the other header beam is connected to the opposite end portion of the front shade, which end portion is located adjacent to the top of the window frame when the front shade is substantially, completely unfolded.

In conjunction with the foregoing embodiments in which a translucent front shade and an opaque back shade are utilized, a great number of light passing/light blocking configurations can be achieved by the user of the window shade assembly. In one case, for example, light passes outside of the room into the room through bottom sections of the front shade when the front shade is unfolded and the back shade is partially unfolded from the top of the window frame. In another position of the window shade assembly achievable by the user, light passes through the entire front shade, which is unfolded, and into the room when the back shade is substantially, completely folded. In another user-controlled example, both shades are completely unfolded whereby substantially all light is unable to pass into the room and a high degree of privacy is achieved. In still another different positioning of the window shade assembly, the user is able to permit light to pass through the window into the room without the light passing through the front shade by causing both the front and back shades to be substantially, completely folded. As can be readily understood and appreciated, a great many more different positions of the independently movable front and back shades can be provided to achieve the desired degree of privacy.

Based on the foregoing summary, a number of salient features of the present invention are readily discerned. Most importantly, varying degrees of privacy are achievable using front-to-back related shades in which the front shade is made of a substantially translucent material and the back shade is made of a substantially opaque material. The window shade assembly of the present invention results in an aesthetically pleasing appearance, which enhances and does not detract from the other decor in the room. In that regard, unlike the stacked double shade, which results in a stack height that is substantially twice that of an equivalent standard, single pleated shade, the present invention results in a stack height substantially equivalent to that of a standard pleated shade. Relatedly, the present window shade assembly presents the same decorator fabric to the room regardless of whether the shade assembly is essentially in a privacy or in a sheer mode since the front shade is viewable to those within the room. The present window shade assembly also achieves a high degree of flexibility or adjustability because of the independent movement of the back shade and, in at least one embodiment, such independent movement can also include movement of both shades from both the top and bottom of the window frame. Furthermore, draw cord visibility in the front shade can be reduced by offsetting the location of the panel apertures through which draw cords are inserted.

Additional advantages of the present invention will become readily apparent from the following discussion, particularly when taken in conjunction with the accompanying drawings.

DETAILED DESCRIPTION

Figure 1:
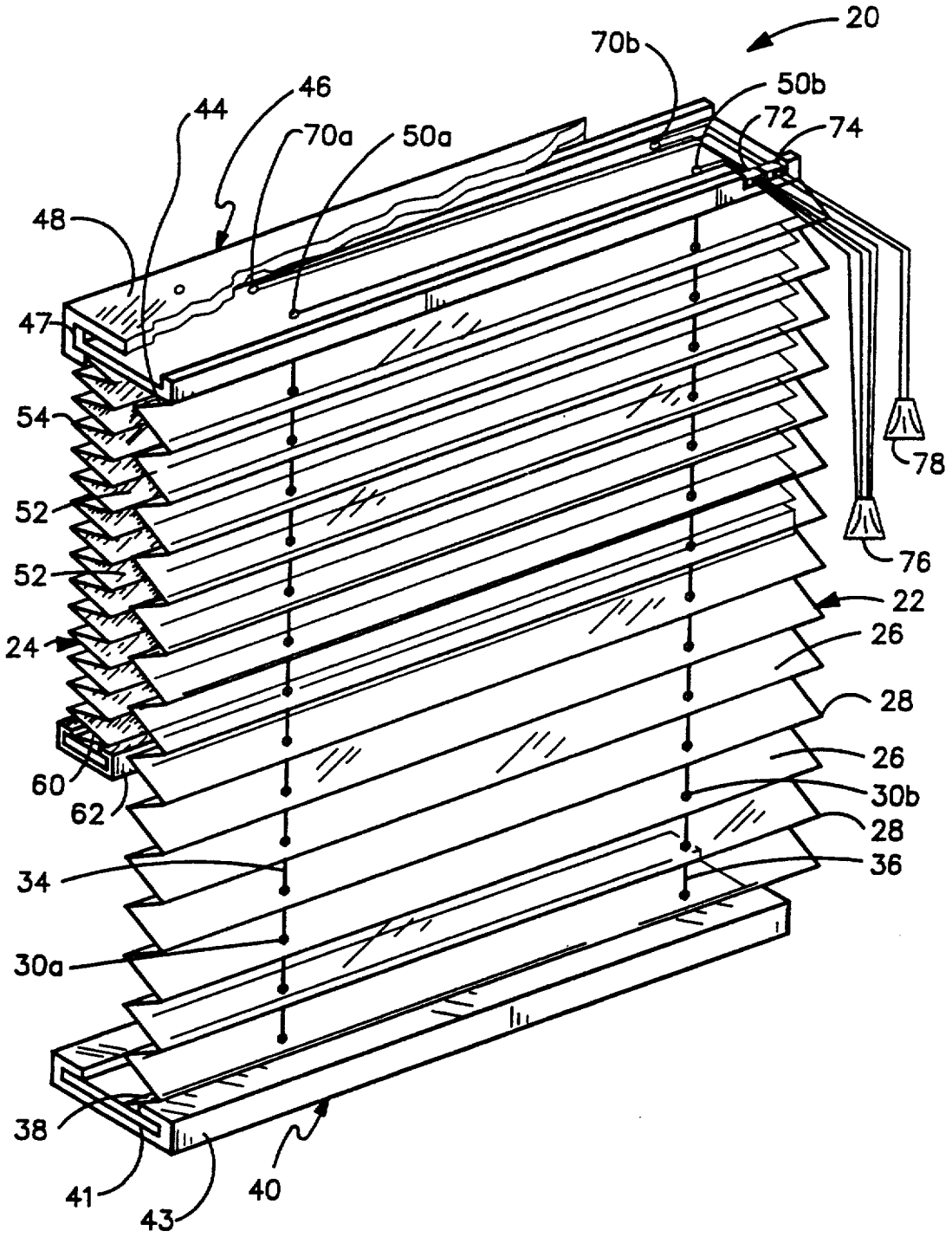
FIG. 1 is a perspective view of a window shade assembly the present invention.
Figure 2:
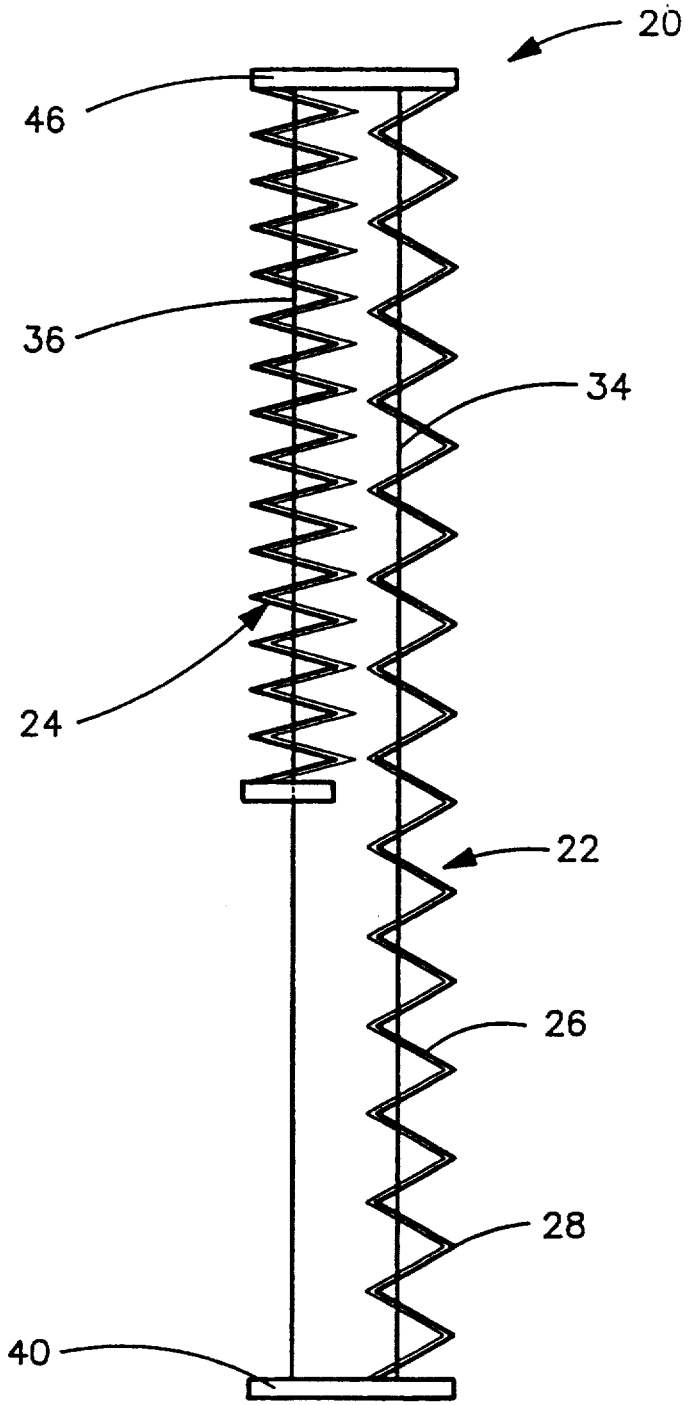
FIG. 2 is a side view of the window shade assembly of FIG. 1.
Figure 3:
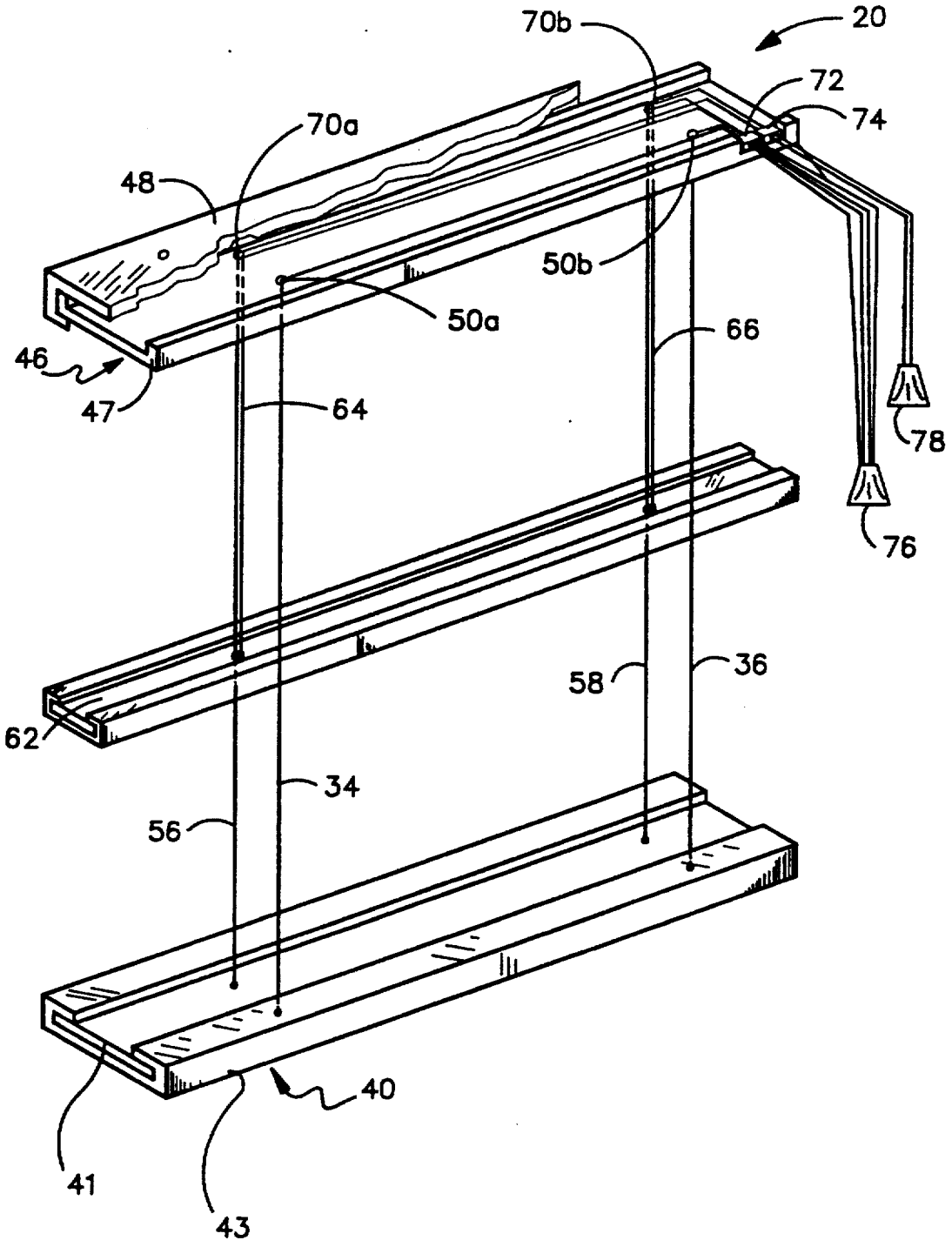
FIG. 3 is a perspective view of the window shade assembly of FIG. 1 with the front and back shades removed.

In accordance with the present invention and with reference to FIGS. 1-3, a window shade assembly 20 is provided including a front or first shade 22 and a back or second shade 24. The front shade 22 is to be disposed in a window frame more adjacent to the interior of the room than is the back shade 24. The front shade 22 is pleated and is comprised of a number of panels 26, with each panel having a pleat 28. The longitudinal extent of each panel 26 has a length that substantially corresponds to the width of the window frame with which it is to be used. As illustrated in FIG. 1 also, each of the panels 26 includes a pair of apertures 30a, 30b. The aperture 30a is formed near one longitudinal end of each panel 26 while the aperture 30b is formed near the opposite end. The apertures 30a, 30b are spaced an equal distance from a vertical axis through the center of the longitudinal extent of the panels 26. The apertures 30a are aligned for receiving therethrough a first draw cord 34 while the aligned apertures 30b receive a second draw cord 36.

As best illustrated in FIG. 2, in the preferred embodiment, the apertures or eyelets 30a, 30b are formed off centered from the mid portion or longitudinal center axes of the panels 26. Instead of being formed through a small area about midway between the top and bottom of each panel 26, the apertures 30a, 30b are located at a distance from such a mid portion. That is, the apertures 30a, 30b are alternately formed more adjacent to one of the tops or bottoms (pleats) of the panels 26. Because of such a location of the apertures 30a, 30b, the draw cords 34, 36 are relatively more hidden when positioned in the apertures 30a, 30b. Consequently, a more aesthetically pleasing appearance is provided because of the reduced exposure of the draw cords. In conjunction with this location of the apertures and the draw cords for the front shade 22, it is important that a bottom movable header beam 40, to which a bottom end portion 38 of the front shade 22 is connected, be of a width, as illustrated in FIG. 2, of about twice, or greater, than the width of the panels 26. It has been found that, if the width of the bottom header beam 40 is about the same width as that of the panels 26, there is a bowing or curving of the bottom header beam 40 and also some bowing of the front shade panels 26 when the front shade 22 is drawn up to its folded or up position. Further, is has been found that, when the width of the bottom header beam 40 is only about the same width as the panels 26, the bottom header beam 40 tends to tilt or bend down when the front shade 22 is unfolded or in a down position, instead of being essentially straight out in a lateral direction. Thus, the combination of the location of the apertures and draw cords, together with the width of the header member, enhance the appearance of the window shade assembly 20.

The header beam 40 is adapted to be received by or held at the bottom of the window frame for receiving the window shade assembly 20. That is, the header beam 40 is of a size, having a length and width, for being received by the bottom of the window frame. The header beam 40 commonly includes an insert member 41 and an extrusion member 43 surrounding substantial portions of the insert member 41, with the bottom end portion 38 of the front shade 22 being fixedly joined to the insert member 41.

Each of the draw cords 34, 36 terminates at the header beam 40 and each is fastened thereto by conventional means. A second or top end portion 44 of the front shade 22 is joined in a conventional manner to a top or second header beam 46. Like the bottom header beam 40, the top header beam 46 includes an insert member 47, which is covered by an extrusion member 48, which is adapted to be connected to the top or upper frame portions of the window frame receiving the window shade assembly 20. In such a manner, the top header beam 46 is maintained in a fixed relationship relative to the top of the window frame. As also can be seen in FIG. 1, holes 50a, 50b are provided in the insert member 47 in vertical alignment with the apertures 30a, 30b, respectively. The hole 50a receives the first draw cord 34 while the hole 50b receives the second draw cord 36.

Like the front shade 22, the back shade 24 is comprised of a number of pleated panels 52, with the panels 52 having pleats 54. The longitudinal extents of the panels 52 extend across the width of the window frame whereby the longitudinal extents of the panels 52 are the same as the lengths or longitudinal extents of the front shade panels 26. The panels 52 are each provided with a pair of apertures or eyelets for receiving window shade draw cord. In particular, third draw cord 56 (FIG. 3) is received by apertures (not shown) formed in the back shade 24, which draw cord 56 is laterally spaced from and in parallel alignment with the first draw cord 34, when the two shades 22, 24 are unfolded. The third draw cord 56 extends through the apertures of the back shade 24 and, similar to the first draw cord 34, is conventionally connected to the insert member 40, but spaced from the first draw cord 34 by a desired lateral distance. Likewise, further apertures or eyelets (not shown) formed in the back shade 24 receive a fourth draw cord 58 (FIG. 3), which is parallel to and laterally spaced in alignment with the second draw cord 36. The fourth draw cord 58 terminates at one of its two ends at the insert member 41 and is conventionally connected thereto.

In contrast to the front shade 22 depicted in the embodiment of FIGS. 1-3, first or bottom end portion 60 of the back shade 24 is conventionally joined to a movable intermediate header beam 62 along the longitudinal extent of the end portion 60 and the header beam 62. As will be explained in greater detail later, the intermediate header beam 62 is used in providing independent movement of the back shade 24 relative to the front shade 22. In connection with providing such independent movement, a fifth draw cord 64 (FIG. 3) is inserted through the same apertures formed in the panels 52 as is the third draw cord 56. Unlike the draw cord 56, the draw cord 64 terminates at and is connected to the header beam 62. Similarly, a sixth draw cord 66 (FIG. 3) is inserted into and received by the same apertures of the back shade 24, which also receive the fourth draw cord 58. Like the draw cord 64, the draw cord 66 terminates at and is conventionally connected to the intermediate header beam 62. The draw cord 66 is also used in providing the independent movement of the back shade 24. As can be seen in FIGS. 1 and 3, the top header beam 46 is also formed with holes 70a, 70b. The hole 70a receives both the draw cords 56, 64 while the hole 70b receives both the draw cords 58, 66.

Preferably, movement of the draw cords 34, 36, 56, 58, 64, 66, is controlled using cord lock mechanisms or units 72, 74. More specifically, draw cords 34, 36, 56, 58, which are associated with the front shade 22 and are connected to the bottom header beam 40, are received by and pass through the cord lock mechanism 72. The operation of the cord lock mechanism 72 is controlled by the user to lock/unlock the draw cords to permit up/down movement of the front shade 22. Similarly, the draw cords 64, 66, which are associated with the back shade 24, are received by and pass through the cord lock mechanism 74. The operation of the cord lock mechanism 74 is also controlled by the user to lock/unlock the draw cords 64, 66 and thereby control up/-down movement of the back shade 24. As also represented in FIGS. 1 and 3, conventional hand grip members 76, 78 are connected to the draw cords, with the grip member 76 connected to the draw cords associated with the front shade 22 while the grip member 78 is connected to the draw cords associated with the back shade 24. Consequently, the user is able to control movement of the front shade 22 by causing the draw cords, associated with the front shade 22 and the bottom header 40, to be unlocked relative to the cord lock mechanism 72 and by controlling movement of such draw cords using the grip member 76. Similarly, the user is able to control up/down movement of the back shade 24 by causing the cord lock mechanism 74 to be unlocked and manipulating the draw cords 64, 66 using the grip member 78.

The cord lock mechanisms 72, 74 are well-known devices and can be commercially obtained, such as, for example, "Arquati" cord locks. The Arquati cord locks are an example of a locking jaw action cord lock. It should be appreciated, however, that the cord locks need not be of the locking jaw type cord lock. Other types of cord locks would also work in the present invention. It should also be understood that a cord lock is not essential to the present invention. The shades 22, 24 could be locked in place by wrapping the draw cords around a cord cleat, which is attached to the window frame or adjacent wall.

An important feature associated with the shades 22, 24 of the present invention relates to the providing of a desired degree of privacy by means of the independent movement of the back window shade 24 relative to the front shade 24, in combination with the materials from which the window shades 22, 24 are made. In particular, the front shade 22 is made of a translucent pleated material and, in one embodiment, the front shade is a light filtering texture linen-look woven material, which is commercially available, for example, from "Louver-Drape." The translucent or light passing material of the front shade 22 permits the viewer to both see into and out of the front shade 22. The back shade 24 is made of an opaque or light blocking material whereby the substantial majority of light impacting on the back shade material is reflected or absorbed. In one embodiment, opaque pleated material, which is available from Arquati, blocks about 97% of the incident light. There are other suppliers of similar opaque pleated material. It should also be understood that other sources of substantial light blocking pleated material exist, which block at least about 50% of the incident light.

The use of a translucent front shade 22 and an opaque back shade 24 enables the user to control the amount of light passing through the window including the front shade 22, when it is in a down position covering the window. That is, depending upon the vertical position or degree of unfolding of the back shade 24 relative to the front shade 22, more or less light is able to pass through the window, having the window shade assembly 20, into the room. For example, with reference to FIG. 4, light is able to pass through the front shade 22 and between the bottom header beam 40 and the intermediate header beam 62, associated with the opaque back shade 24. Conversely, outside or exterior light incident upon the back shade 24 is absorbed or reflected by the back shade 24 whereby at least about a majority of the incident light does not pass through the back shade 24 and, accordingly, does not pass through the front shade 22. Consequently, a viewer is unable to see into and out of the room along the length of the back shade 24 that extends in a vertical direction from the top portion 44 of the back shade 24 to the header beam 62.

As can also be seen in FIG. 2, the back shade 24 is spaced a relatively short distance in a lateral direction from the front shade 24, which distance should be sufficient to permit the desired independent folding/unfolding of the pleated window shades 22, 24, while such lateral distance should not be so great as to defeat the light blocking purpose of the back shade 24. It is also desirable that the lateral distance not be so great as to result in greater lateral space being occupied than is necessary by the two parallel disposed shades 22, 24. In one embodiment, the lateral distance between the two shades 22, 24 is such to prevent contact between the pleats 28, 52 while being less than the length, in a vertical direction, of each pleated panel 26, 50.

Figure 4:
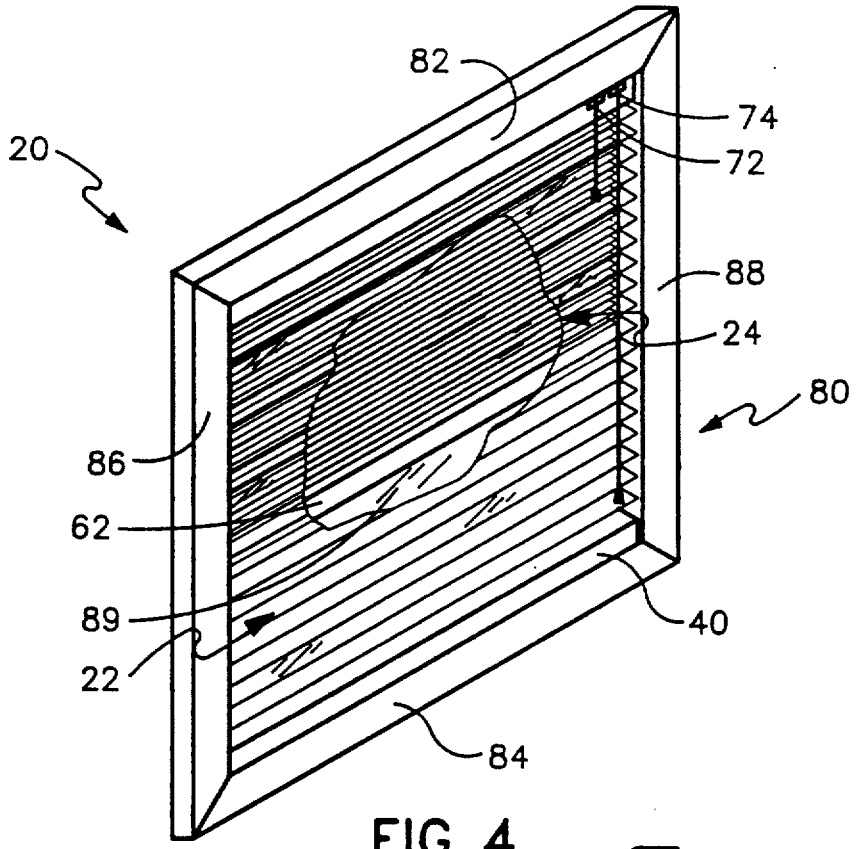
FIG. 4 illustrates the window shade assembly of FIG. 1 with a window frame in which a parallel degree of privacy is achieved.

With regard to the functioning and the considerable number of adjustable positions of the front and back shades 22, 24, reference is now made to FIGS. 4–7. Referring first to FIG. 4, an illustration of the upper half of the window shade assembly 20 blocking light while the lower half thereof permits the passage of light is provided. In particular, the front shade 22 is shown in its completely unfolded state or down position while the back shade 24 is unfolded to about one-half of its completely unfolded state.

The window shade assembly 20 of FIG. 4 is shown attached to or part of a window frame 80, which includes top and bottom frame members 82, 84 and side members 86, 88. The window frame 80 is shown as facing the interior of the room. That is, the front shade 22 faces the interior of the room while the back shade 24 is adjacent to the window 89 held by the window frame. As illustrated in FIG. 4, the bottom header beam 40 is adjacent to the bottom frame member 84. As the cutaway of FIG. 4 illustrates, the back shade 24 only extends in a vertical direction to about one-half the unfolded length of the front shade 22. As a consequence, light passes from exterior of the room through the lower half section of the front shade 22 while passage of light through the upper half section of the front shade 22 does not occur because light is blocked by the back shade 24.

Figure 5:
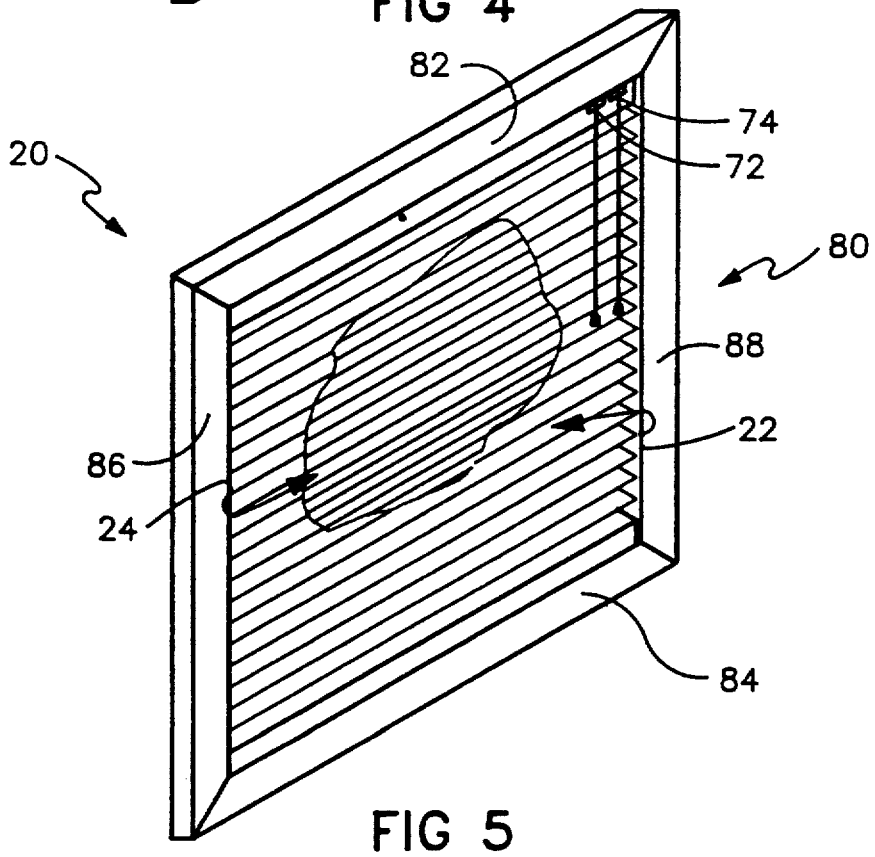
FIG. 5 illustrates another positioning of the window shade assembly of FIG. 1 with a window frame wherein both front and back shades are unfolded so that light does not pass through the window shade assembly.

With reference to FIG. 5, the front and back shades 22, 24 are again illustrated with the window frame 80. However, in this illustration of the positioning of the front and back shades 22, 24, the back shade 24 is shown in its completely unfolded state or down position, just like the front shade 22. As a consequence, exterior light is unable to pass through any portion of the window shade assembly 20 due to the blocking of such light by the opaque back shade 24. As a result, exterior light is substantially prevented from entering or passing into the room having the window shade assembly 20.

Figure 6:
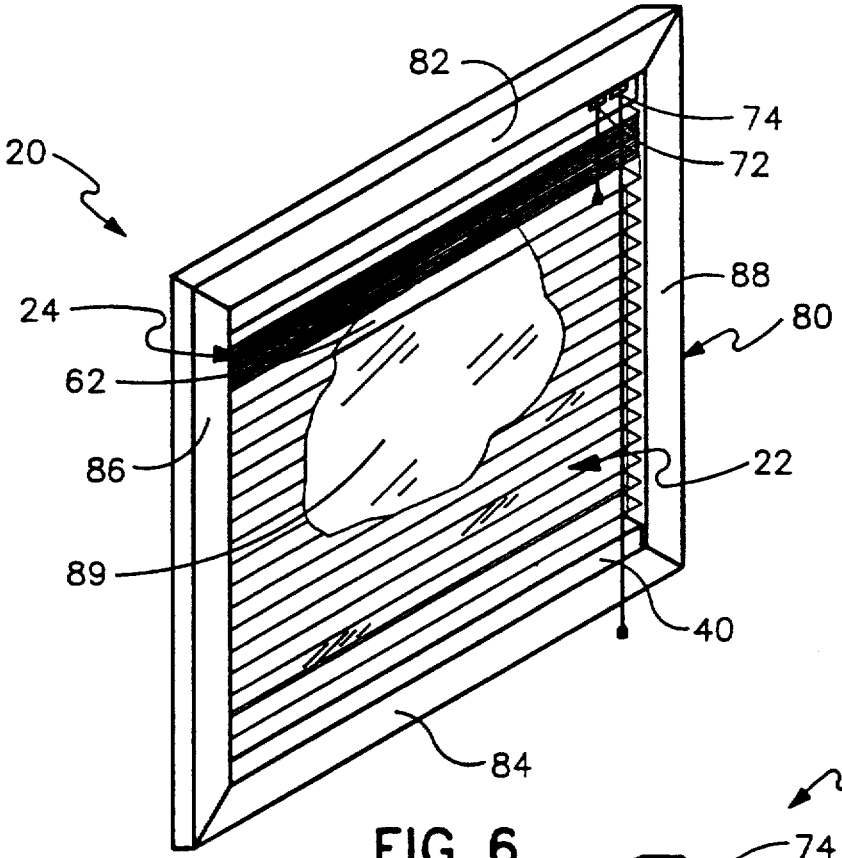
FIG. 6 illustrates the window shade assembly of FIG. 1 with a window frame in which the front shade is unfolded and the back shade is folded so that light is able to pass through essentially the entire front shade.

A further example of the positioning of the front and back shades 22, 24 is illustrated in FIG. 6. In this example, the back shade 24 is in its completely folded state or up position while the front shade 22 remains in its substantially unfolded state or down position. Consequently, exterior light is able to pass through substantially all portions of the back side of the front shade 22 and into the room having the window shade assembly 20. It should also be noted that this configuration or positioning of the front and back shades 22, 24, like the positioning of the shades illustrated in FIGS. 4 and 5, results in the same fabric being presented to the interior of the room. That is, even though different degrees or amount of light, or the lack thereof, may be received by the room, the same fabric appearance is presented because the front shade 22 is always seen by the viewer in the room.

Figure 7:
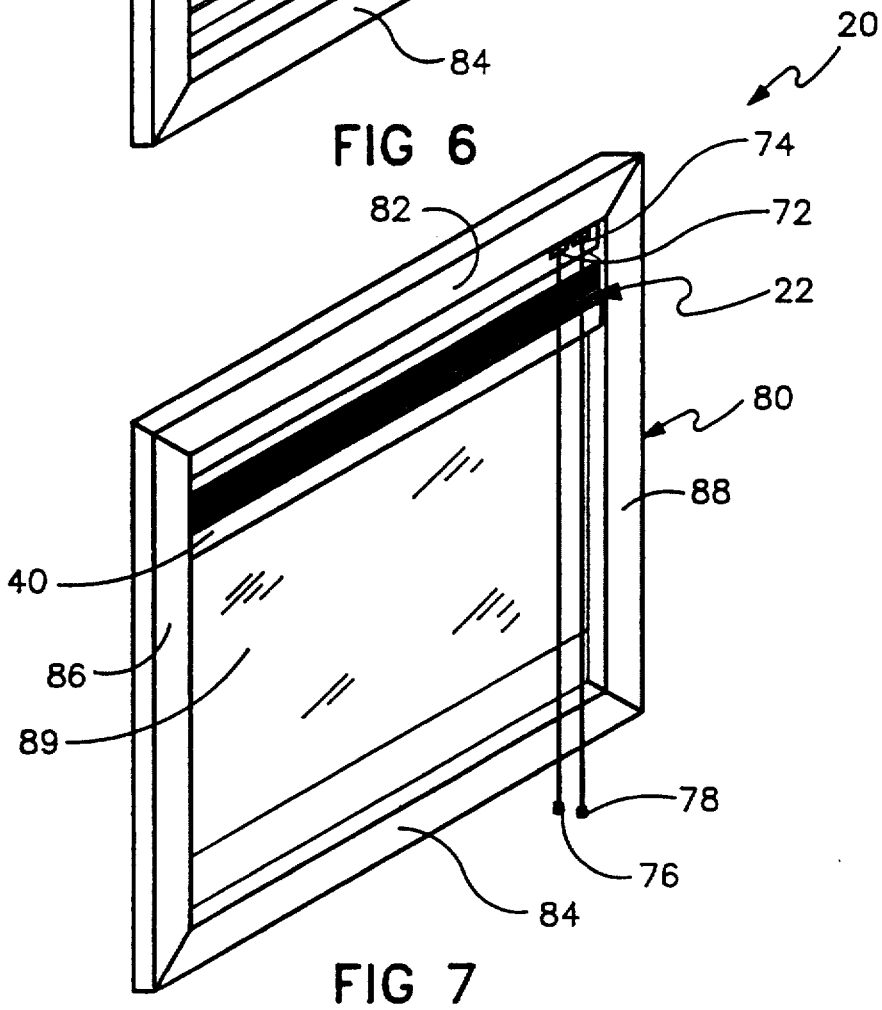
FIG. 7 illustrates another positioning of the window shade assembly of FIG. 1 with the window frame wherein both shades are folded so that light passes directly into the room through the window.

With reference to FIG. 7, just as with conventional pleated shades, both the front and back shades 22, 24 can be positioned in their folded states or up positions whereby exterior light has a direct path into the room through the window 89. Because of the positioning of the draw cores 34, 36, 56, 58, it is only necessary to pull on the grip member 76 in order to pull up both of the front and back shades 22, 24. That is, pulling on the draw cords 34, 36, 56, 58 using the grip member 76 results in the pulling up, and the concomitant folding, of the front shade 22, as well as the back shade 24, when the intermediate header beam 62 is engaged by the back half or back lateral section of the bottom header beam 40. As can be appreciated, the cords 64, 66 become relaxed with the raising of the back shade 24 by the pulling of the grip member 76. This relaxed condition may be maintained with no ill effect or may be removed by merely pulling on the grip member 78.

Figure 8:
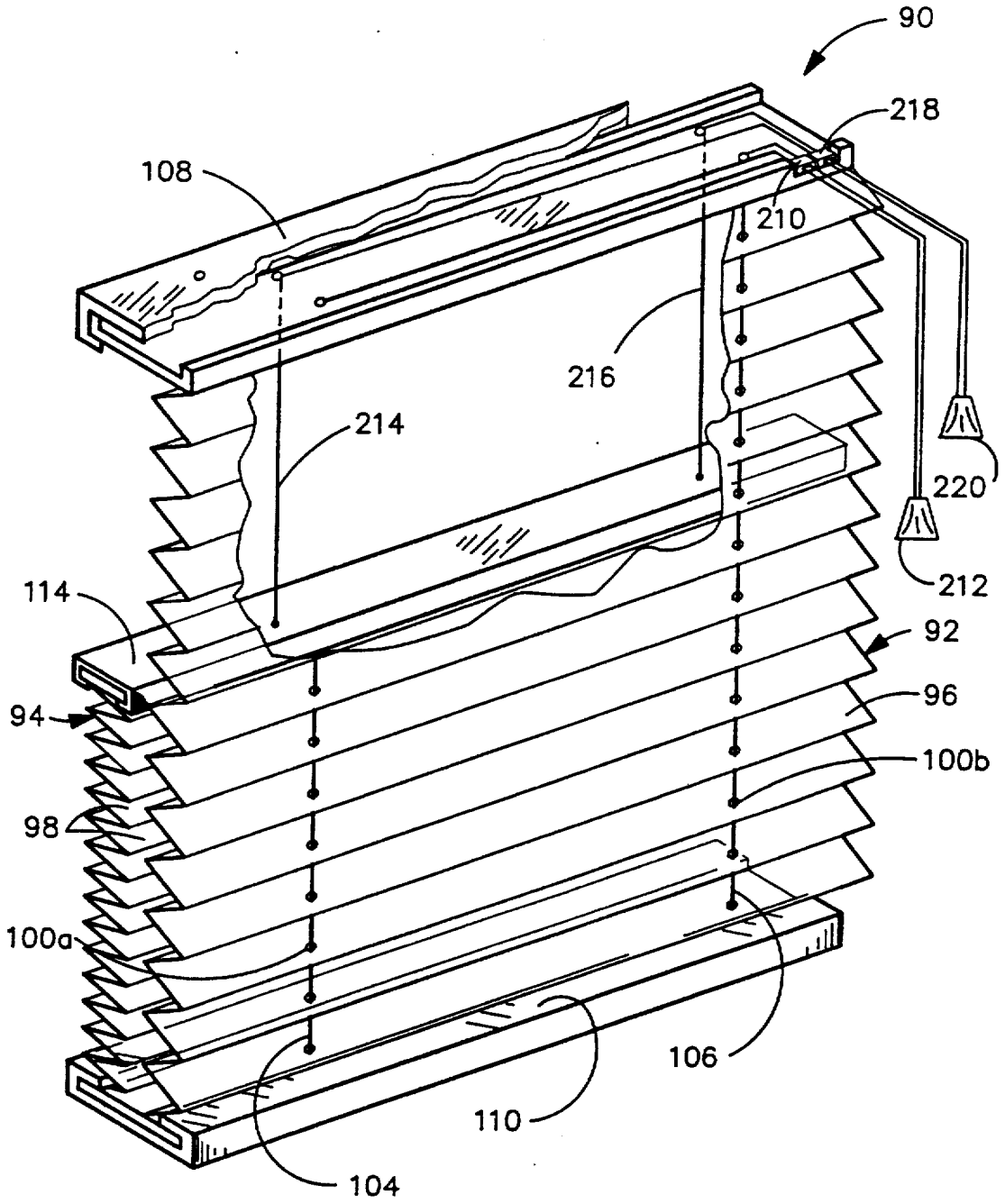
FIG. 8 illustrates another embodiment of the window shade assembly in which the header beam of the front shade is connected adjacent to the end portion of the back shade adjacent to the top of the window frame when the back shade is unfolded.
Figure 9:
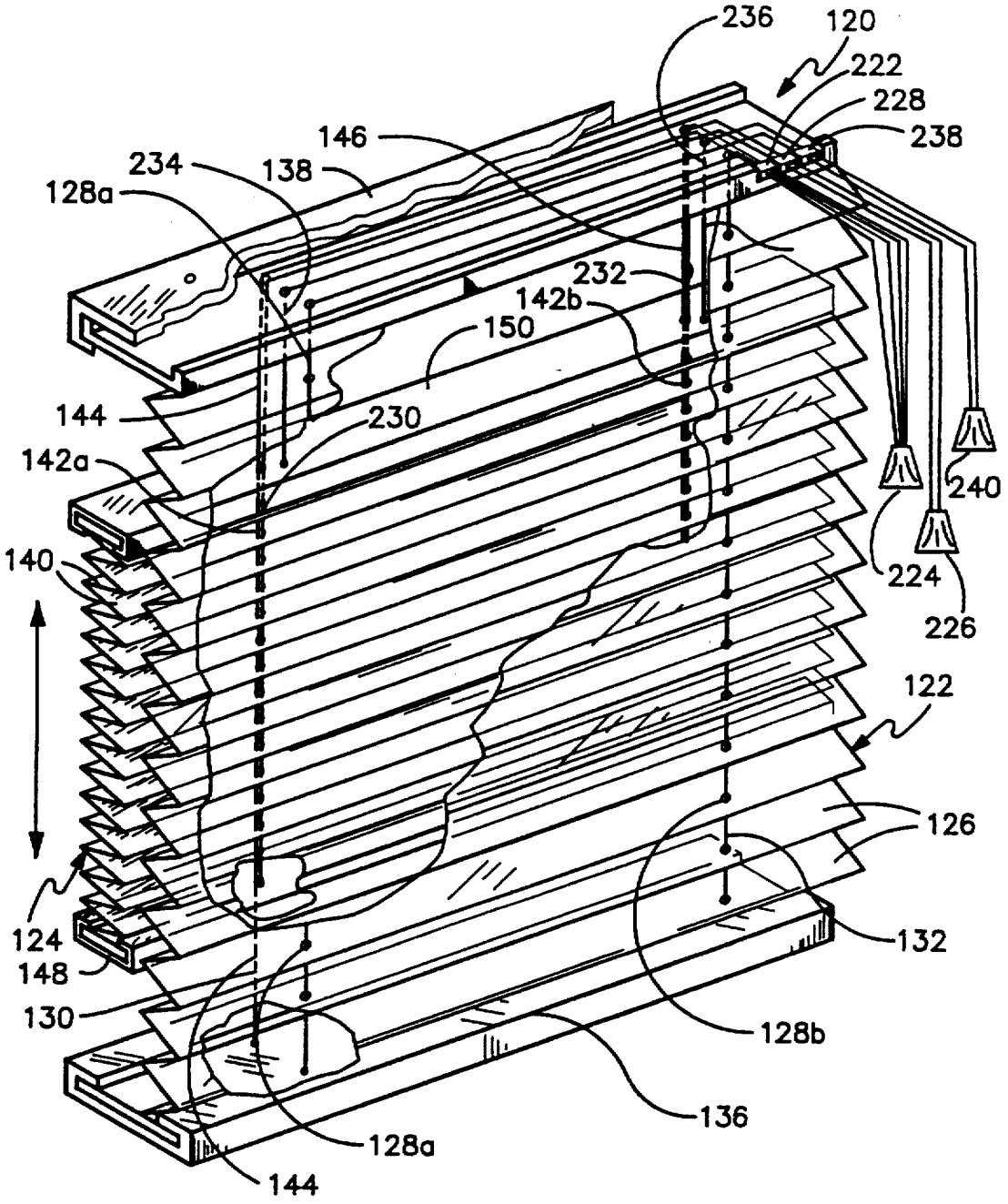
FIG. 9 is a further embodiment of the window shade assembly illustrating the use of a pair of movable header beams connected to both end portions of the back shade.
Figure 10:
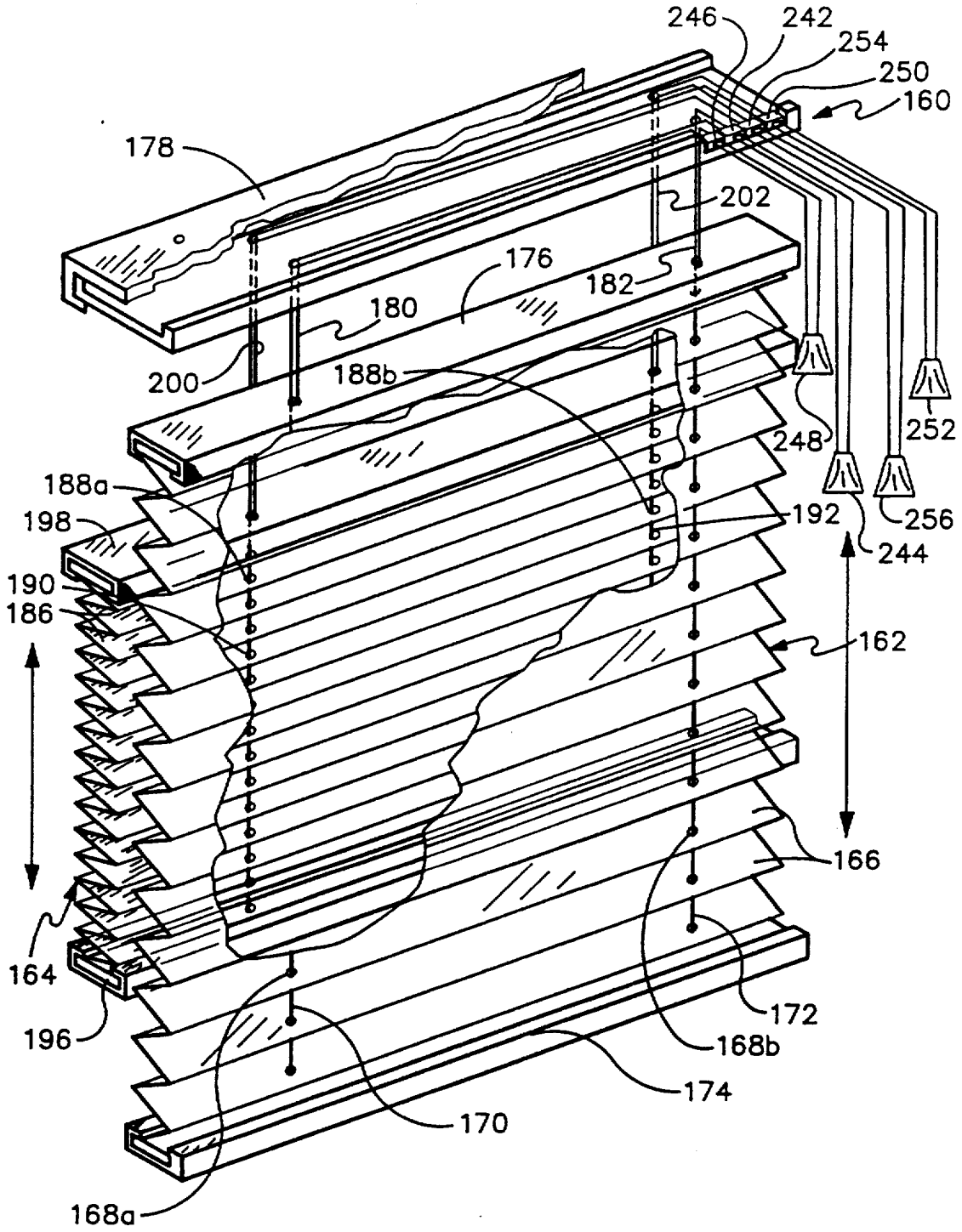
FIG. 10 illustrates still yet another embodiment of the shade assembly in which the front shade is provided with two movable header beams connected to opposite end portions of the front shade and the back shade also includes two movable header beams for independent movement of the front and back shades in two directions.

Although the foregoing drawing figures and description are directed to a particular embodiment in which the back shade 24 is illustrated as having the header beam 62, various other embodiments of the present invention can also be provided, as represented in FIGS. 8–10. With reference initially to FIG. 8, a window shade assembly 90 is illustrated including a front shade 92 and a back shade 94. Each of the shades 92, 94 is comprised of a number of pleated panels 96, 98, respectively. Each of the front shade pleated panels 96 has an aperture 100a, 100b for receiving an inserted draw cord 104, 106, respectively. Similarly, each of the back shade pleated panels 98 has an aperture in substantial laterally spaced alignment with the apertures 100a, 100b of the front shade 92. The window shade assembly 90 also includes a fixed upper header beam 108 and a movable lower header beam 110. The upper header beam 108 corresponds to the top header beam 46 of the embodiment of FIGS. 1–7. Similarly, the lower header beam 110 corresponds to the bottom header beam 40 of the embodiment of FIGS. 1–7. The embodiment of FIG. 8 also includes an intermediate header beam 114 connected to the back shade 94 along longitudinal edges of the back shade 94. In contrast, however, to the previous embodiment, the header beam 114 is connected to a top portion, rather than a bottom portion, of the back shade 94. Stated another way, the header beam 114 is disposed adjacent to the upper header beam 108 when the back shade 94 is in its unfolded state or up position, rather than being disposed adjacent to the lower header beam 110 as is the case in the embodiment of FIGS. 1–7. When controlling the passage of exterior light into the room having the window shade assembly 90, the back shade 94 is, therefore, unfolded in a direction from the lower header beam 110 towards the upper header beam 108. Conversely, when permitting increasing amounts of exterior light to enter the room, the back shade 94 is folded in a direction from the upper header beam 108 towards the lower header beam 110. Draw cords 104, 160 pass through a cord lock mechanism 210 and are controlled for up/down movement therethrough by a grip member 212. Similarly, draw cords 214 and 216 associated with the back shade 94 pass through a cord lock mechanism 218 and are controlled for up/down movement therethrough by a grip member 220. Consequently, in all respects, except for aspects relating to the positioning of the header beam 114, the window shade assembly 90 of FIG. 8 functions and operates in a manner comparable to that of the previous embodiment.

With reference to FIG. 9, another embodiment is illustrated, which differs from the previous two embodiments because it incorporates two intermediate header beams with the back shade, instead of one header beam. Specifically, a window shade assembly 120 is shown and comprises a front shade 122 and a back shade 124. The front shade 122 includes a number of pleated panels 126 having apertures 128a, 128b formed in each of the panels 126. Inserted through the apertures 128a is a draw cord 130 while a draw cord 132 is inserted through the apertures 128b. The draw cords 130, 132 extend between lower and upper header beams 136, 138, respectively. The lower header beam 136 is adapted to be moved adjacent to a bottom window frame member when the front shade 112 is completely unfolded. The upper header beam 138 is to be fixedly connected to the top of the window frame 80.

The back shade 124 also includes a number of panels 140 having apertures 142a, 142b formed therein, which apertures 142a, 142b are essentially in alignment with, but laterally spaced from, the apertures 128a, 128b, respectively, of the front shade 122 when the shades 122, 124 are completely unfolded. The two sets of apertures 142a, 142b are aligned for receiving draw cords 144, 146.

A first intermediate header beam 148 is connected to a bottom portion of the back shade 124 along longitudinal edges of the bottom panel thereof. The draw cords 144, 146 extend through holes in the first header beam 148 and are connected to the lower header beam 136. A second intermediate header beam 150 is also provided and it is connected to a top portion of the back shade 124 along the longitudinal edges of the top panel of the back shade 124. The draw cords 144, 146 extend through holes in the header beam 150 and are received by the upper header beam 138. Cords 144, 146 pass through a cord lock mechanism 222 where they merge with cords 130 and 132 to allow raising and lowering of the header beam 136 by a grip member 224.

As can be readily understood, the draw cords associated with the front and back shades 122, 124 enable the user to cause desired movements or adjustments of the shades. For example, in one adjustment of the back shade 124, the first intermediate header beam 148 can be moved in a direction away from the lower header beam 136 by pulling draw cords 230 and 232 attached to the header beam 148 through a lock mechanism 228 by a grip member 226. The second intermediate header beam 150 can be moved in a direction away from the upper header beam 138 by releasing draw cords 234 and 236 attached to the beam at 150 through a lock mechanism 238 by a grip member 240 whereby the two intermediate header beams 148, 150 move towards each other thereby creating spaces, or a lack of back shade material, between the header beam 148, 150 and their respective upper and lower header beams 136, 138. By means of such an adjustment by the user, two different sections of the front shade 122 emit or pass light into the room having the window shade assembly 120. Specifically, exterior light is able to pass between the upper header beam 138 and the second intermediate header beam 150 while simultaneously passing through the front shade 122 between the lower header beam 136 and the first intermediate header beam 148. Additionally, as can be readily understood, the embodiment of FIG. 9 also provides the flexibility or adjustability found in both of the previous two embodiments since it incorporates into one embodiment both a first intermediate header beam and a second intermediate header beam for adjustment relative to a lower header beam and an upper header beam, respectively.

A still further embodiment of the present invention is illustrated in FIG. 10, four intermediate header beams are provided with the front and back shades to permit independent movement of both shades in both directions. In particular, a window shade assembly 160 is illustrated including a front shade 162 and a back shade 164. The front shade 162 includes a number of pleated panels 166, with each panel 166 having apertures 168a, 168b formed therein for receiving draw cords 170, 172, respectively. The bottom ends of the draw cords 170, 172, as well as longitudinal end portions of the bottom panel of the front shade 162 terminate at and are connected to a first header beam 174. The opposite end portion of the front shade 162 is connected along its longitudinal edge to a second header beam 176. The draw cords 170, 172 extend through the second header beam 176 and are received by an upper fixed header beam 178. The draw cords 170, 172 are use in adjusting or manipulating movement of the first header beam 174 by pulling/releasing the draw cords 170, 172 through a lock mechanism 242 by a grip member 244 to cause desired folding/unfolding of the front shade 162, depending upon whether or not the first header beam 174 is moved towards or away from the upper header beam 178. A second set of draw cords 180, 182 terminate at and are connected to the second header beam 176 and the opposite ends thereof are received by the upper header beam 178. The draw cords 180, 182 are caused to move by the user by pulling/releasing the draw cords 180, 182 through a lock mechanism 246 by a grip member 248 to vary the position of the second header beam 176 and thereby cause folding/unfolding of the front window shade 162. That is, when the second header beam 176 is caused to move in a direction away from the upper header beam 178, there is a folding of the front shade 162 while movement of the second header beam 176 in a direction towards the upper header beam 178 results in an unfolding of the front window shade 162.

With regard to the back shade 164, it includes pleated panels 186 having apertures 188a, 188b formed therein for receiving draw cords 190, 192. The bottom ends of the draw cords 190, 192, as well as the longitudinal end portion of the bottom panel of the back shade 164 terminate at and are connected to a third header beam 196. The opposite end portion of the top panel of the back shade 164 is connected along its longitudinal edge to a fourth header beam 198. The draw cords 190, 192 extend through the fourth header beam 198 and are received by the upper header beam 178. The draw cords 190, 192 are used in adjusting or manipulating movement of the third header beam 196 by pulling/releasing the cords 190, 192 through a lock mechanism 250 by a grip member 252 to cause desired folding/unfolding of the back shade 164, depending upon whether or not the fourth header beam 196 is moved towards or away, respectively, from the upper header beam 178. Another set of draw cords 200, 202 terminates at and are connected to the fourth header beam 198 and the opposite ends thereof are received by the upper header beam 178. The draw cords 200, 202 are caused to move by the user by pulling/releasing the cords 200, 202 through a lock mechanism 254 by a grip member 256 to vary the position of the fourth header beam 198 to cause folding-/unfolding of the back window shade 164. That is, when the fourth header beam 198 moves in a direction away from the upper header beam 178, there is a folding of the back shade 164 while movement of the fourth header beam 198 in a direction toward the upper header beam 178 results in an unfolding of the back window shade 164.

From the foregoing, it can be readily seen that the embodiment of FIG. 10 enables the user to exercise a high degree of flexibility in positioning the front and back shades 162, 164. That is, there is complete independent movement of each of the top and bottom sections of both window shades. As a result, it is feasible to utilize a decorative or design back shade having a different color than the front shade. For example, one available configuration permits the direct passage of light through the window associated with the window shade assembly 160 at both lower and upper sections of the window shade assembly 160 while blocking the passage of light in the intermediate section of the window shade assembly 160, which is between such upper and lower sections. That is, by lowering the second and fourth header beams 176, 198, respectively, to a distance substantially the same from the upper header beam 178, while raising the first and third header beams 174, 196, respectively, to a distance substantially the same from the bottom of the window frame, direct light passes through the window between the upper header beam 178 and the second and fourth header beams 176, 198, as well as passing between the bottom of the window frame and the first and third header beams 174, 196. Exterior light from outside of the room is blocked between the header by means of the opaque back shade 164. As can be appreciated, a considerable number of other configurations or positions of the front and back shades 162, 164 are equally feasible.

The foregoing description of the invention has been presented for purposes of illustration and description. Further, the description is not intended to limit the invention to the form disclosed herein. Consequently, variations and modifications commensurate with the above teachings, with the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by their particular applications or uses of the invention. It is intended that the appended claims be construed to include alternative embodiments to the extent permitted by the prior art.

What is claimed is:

1. A window shade assembly adapted to be used with a window frame having a first end and second end, comprising:

a first [pleated] shade;

first means for moving said first [pleated] shade;

a second [pleated] shade independently movable relative to said first pleated shade, said first and second [pleated] shades being positioned in a front-to-back relationship;

second means for moving said second [pleated] shade;

first header beam means connected to said first [pleated] shade and movable relative to the window frame with said first [pleated] shade; and second header beam means connected to said second [pleated] shade and movable relative to the window frame with said second [pleated] shade;

wherein said first header beam means has a width greater than the width of said second header beam means and is detached therefrom, with said second header beam means being movable relative to said first header beam means but, when said first header beam means is moved in a substantially vertical direction, said second header beam means is adapted to be contacted by portions of said first header beam means so that said first header beam means and said second header beam means are able to move vertically together using said first header beam means movement.

2. An assembly, as claimed in claim 1, wherein:

said first [pleated] shade is substantially comprised of a light-passing material and said second [pleated] shade is substantially comprised of a light-blocking material.

3. An assembly, as claimed in claim 2, wherein:

said light-blocking material prevents the passage of at least about 50% of the light incident thereon.

4. An assembly, as claimed in claim 1, wherein:

said first means for moving includes cord means for moving said first [pleated] shade, wherein said first [pleated] shade includes a number of pleated panels and in which said cord means is disposed through said pleated panels in an off-center position.

5. An assembly, as claimed in claim 1, wherein:

said second means for moving includes cord means and means for locking said cord means to prevent unwanted movement of said cord means.

6. An assembly, as claimed in claim 5, wherein:

said cord means includes a free end adapted to be moved to enable said cord means and said second [pleated] shade to be moved.

7. An assembly, as claimed in claim 1, wherein:

said second header beam means includes a first header beam adapted to be moved between the first end and the second end of the window frame and wherein said first header beam is located adjacent to the first end of the window frame when said second [pleated] shade is in a substantially unfolded state.

8. An assembly, as claimed in claim 1, wherein:

said second header beam means includes a second header beam adapted to be moved between the first end and the second end of the window frame and wherein said second header beam is located adjacent to the second end of the window frame when said second [pleated] shade is in a substantially unfolded state.

9. An assembly, as claimed in claim 1, wherein:

said second header beam means includes a first header beam and a second header beam with said first and second header beams adapted to be moved between the first and second ends of the window frame, said first header beam is located more adjacent to the first end of the window frame than is the second header beam and said second header beam is located more adjacent the second end of the window frame than is said first header beam.

10. A window shade assembly adapted to be used with a window frame having a first end and a second end, comprising:

a first [pleated] shade;

first means for moving said first [pleated] shade;

a second [pleated] shade independently movable relative to said first [pleated] shade, said first and second [pleated] shades being positioned in a front-to-back relationship;

second means for moving said second [pleated] shade;

first header beam means connected to said first [pleated] shade and movable relative to the window frame with said first [pleated] shade; and second header beam means connected to said second [pleated] shade and movable relative to the window frame with said second [pleated] shade;

wherein said first header beam means has a width greater than the width of said second header beam means and is detachable therefrom, with said second header beam means being movable relative to said first header beam means and in which said second means for moving includes portions connected to said first header beam means for aligning and guiding said second [pleated] shade during movement of said second [pleated] shade.

*11. An assembly, as claimed in claim 1, wherein:*

*said first shade is pleated.*

*12. A window shade assembly adapted to be used with a window frame and including a front side and a back side comprising:*

*a first shade having a width;*

*a second shade having a width and being independently movable relative to said first shade, said first and second shades being positioned in a front-to-back relationship;*

*header beam means connected to said first shade, said header beam means including a front side and a first*

*end, said header beam means having a length and a width with said length being greater than said width and said length extending along said widths of said first and second shades;*

*first means for moving said first shade substantially vertically, said first means being positioned to be operated from the front side of the window shade assembly, said first means including at least a first cord and a second cord; and*

*second means for moving said second shade substantially vertically, said second means being positioned to be operated from the front side of the window shade assembly, said second means including at least a third cord and a fourth cord;*

*wherein each of said first and second cords has a cord length that extends firstly from said first shade in a direction greater along said length than said width of said header beam means and then secondly in a direction greater along said width than said length of said header beam means and each of said third and fourth cords has a length that firstly extends in a direction greater along said length than said width of said header beam means from said second shade and then secondly in a direction greater along said width than said length of said header beam means, said first cord length extending along said length of said header beam means relatively more adjacent to said front side of said header beam means than does said third cord length and in which substantially all of said third and fourth cord lengths are disposed outwardly in said header beam means relative to said first and second cord lengths whereby substantially no contact is made among said third and fourth cord lengths and said first and second cord lengths, with portions of said third and fourth cord lengths extending toward said front side of said header beam means being more adjacent to said first end of said header beam means than are portions of said first and second cord lengths.*

*13. An assembly, as claimed in claim 12, wherein:*

*each of said first, second, third and fourth cords exits said header beam means adjacent said first end thereof.*

*14. An assembly, as claimed in claim 12, wherein:*

*said first and second cords are operatively connected to said first shade and said third and fourth cords are operatively connected to said second shade and said second shade is in back of said first shade.*

* * * * *